Oct. 29, 1963   W. F. BUCHELE ETAL   3,108,471
TORQUE INDICATOR
Filed April 20, 1960
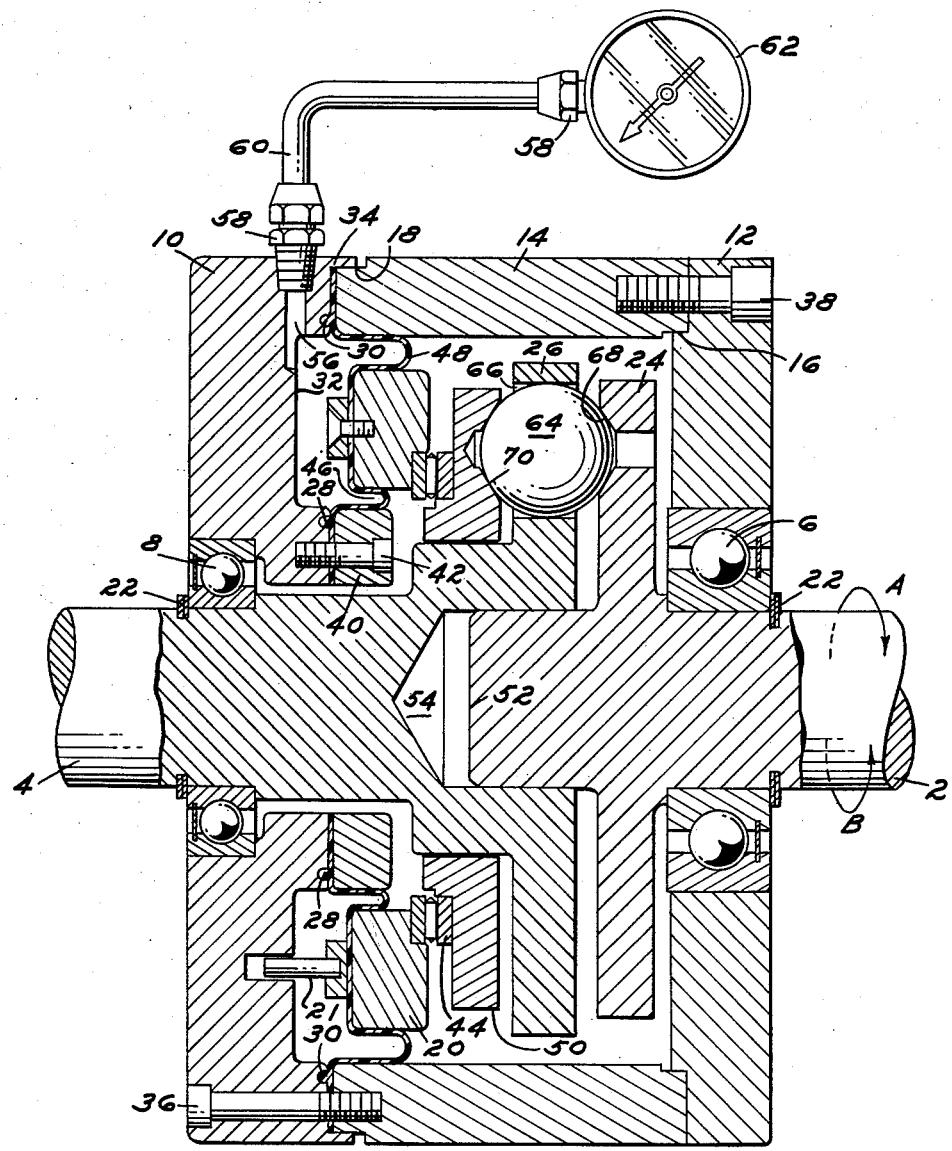
INVENTORS
WESLEY F. BUCHELE
KENNETH R. WALTZ
BY
Barnes, Kisselle, Raisch & Choate
ATTORNEYS

United States Patent Office 3,108,471
Patented Oct. 29, 1963

3,108,471
TORQUE INDICATOR
Wesley F. Buchele, 5364 Sleight Road, Bath, Mich., and Kenneth R. Waltz, 27164 Westland, Detroit 40, Mich.
Filed Apr. 20, 1960, Ser. No. 23,553
4 Claims. (Cl. 73—136)

This invention relates to torque indicators adapted to indicate the torque being transmitted from one shaft to another and to indicate variations in the torque as they occur.

The present invention relates particularly to a torque indicator wherein the driving and driven shafts do not move axially relative to each other during torque transmission and indicating functions of the apparatus.

In general, the invention includes a pair of shafts arranged in end to end relation and rotatably mounted in a fixed frame. The shafts are held against relative axial movement and are provided with means at their adjacent ends to transmit torque from one to the other.

In general, the means comprise an element for transmitting a partially tangential and partially axial force in an oblique direction; the means for so transmitting the torque engages shoulders or other structure rigidly fixed on the respective shafts for receiving the tangential component of the force and converting it to torque on the driven shaft. The force transmitting means are so arranged as to be axially movably with respect to both shafts and in response to the axial component so that axial movement may be detected and the force causing such movement may be measured as an indication of torque. The means for resisting axial movement of the force transmitting means comprises generally a thrust bearing mounted on the frame in position to receive the axial thrust, permitting the member to rotate with the shafts and relative to the frame. The thrust bearing preferably engages a diaphragm overlying a recess on the frame structure and contains a suitable liquid. Thrusts on the bearing thus tend to compress the liquid and a pressure indicator is employed to indicate the pressure in the body of liquid as a measure of the torque.

The arrangement contemplated is particularly advantageous in that it enables the employment of a hydraulic pressure measuring system without the necessity of causing rotation of the hydraulic fluid. It will be recognized that there is no fixed relationship between the speed of rotation of the shafts and the torque being transmitted.

It is therefore an object of this invention to provide a torque measuring apparatus capable of indicating true torque irrespective of the speed of rotation of the shafts.

It is a further object of this invention to provide a torque measuring and indicating apparatus for measuring the torque transmitted from one shaft to another without relying on axial movement of either shaft to produce an indication.

Another object of this invention resides in the provision of a torque indicator employing a hydraulic system wherein the hydraulic fluid is not subjected to centrifugal force.

It is still another object of this invention to provide a torque measuring and indicating device of simple construction yet economical to produce and of high sensitivity, accuracy and linearity.

A still further object of this invention resides in the provision of a torque indicator wherein all rotating parts are of rugged construction and capable of a long useful life and wherein wear on the moving parts does not affect the accuracy of the indicated results.

Another object of this invention resides in the provision of the torque measuring and indicating features wherein all instrumentalities performing a measuring or indicating function are non-rotatably mounted on a fixed frame.

A further object of the invention is the improved design of force transmitting device wherein it is more easily machined and in addition it produces a straight line output more readily recorded and observed. The invention also contemplates the use of a diaphragm of unusual design which at all times presents a uniform area to pressure fluid thus assisting in the straight-line recording of the torque measurement.

Still further objects and advantages in design and operation will be apparent in the following description and claims.

The drawing is a longitudinal sectional view of an apparatus constructed in accordance with the present invention.

Referring to the drawing: A pair of shafts, comprising, a driving shaft 2 and a driven shaft 4 are mounted by means of anti-friction bearings 6 and 8 in a stationary frame structure. The stationary frame structure comprises frame members 10 and 12 of generally annular shape and provided with bores adapted to snugly receive the anti-friction bearings 6 and 8 to rotatably mount shafts 2 and 4 in axial alignment with each other. Bearing 6 is a radial and axial thrust unit while bearing 8 can be a simple radial bearing. A ring or casing member 14 fits in a rabbet 16 on frame member 12 and in a rabbet 18 on frame member 10. The casing or ring member 14 functions to enclose the apparatus and to maintain adjacent ends of the shafts 2 and 4 in relatively axially fixed relationship. Shafts 2 and 4 are shown as cylindrical in shape. It is also possible to employ either internal or external splines in either shaft 2 or shaft 4. The inner races of the anti-friction bearings 6 and 8 may be press-fitted to the frame members 12 and 10 respectively and then retained by internal snap rings or the like and thus assist in preventing relative axial movement of the shafts. Preferably split retainer rings 22 are provided to maintain the bearings 6 and 8 in assembled relation to the shafts 2 and 4.

The adjacent ends of the shafts 2 and 4 are provided with flange members 24 and 26 respectively. The flange members 24 and 26 may be integral with their respective shafts or may be separately fabricated and rigidly mounted on the shafts as by welding or the like. In the drawing, the flanges are of circular shape.

The flange 26 has a cylindrical opening 66 extending therethrough in an axial direction but outward of the axis of shaft 4 so that the entire opening lies in the radially projecting portion of the flange as clearly illustrated in the drawing.

The frame member 10 is formed with an annular recess 32 having its open side directed toward the flange 26. The annular recess 32 is covered by a flexible annular diaphragm 34 extending completely thereacross and across the end face of the end member 10. The casing 14, previously referred to, overlies the outer marginal portion of the diaphragm 34 to clamp the diaphragm to the frame member 10, outwardly of the recess 32. Suitable cap screws 38 constitute means for clamping frame member 12 to casing 14 in assembled relation. Suitable cap screws 36 constitute means for clamping frame member 10 to casing 14 in assembled relation.

The inner margin of the diaphragm 34 is clamped to the frame member 10 by means of an inner clamping ring 40 and suitable screws 42 extend through the clamping ring 40 into threaded engagement with frame member 10. It will thus be seen that the recess 32 and the diaphragm 34 define a completely enclosed, annular, expansible chamber positioned concentrically about the shaft 4.

The diaphragm 34 may be of any desired suitable material but is preferably constructed of a nylon fabric impregnated with neoprene. If desired, the fabric may be employed as internal reinforcement embedded in a sheet of neoprene or the like. The diaphragm 34 is generally annular in shape with integrally molded beads 28 and 30 near the inside and outside diameters respectively, for sealing the hydraulic fluid within the recess 32.

An axial thrust bearing 44 such as a needle bearing assembly is arranged concentrically about the shaft 4 with its inner race contacting an inner ball race in the form of an annular body member 50 rotatably and slidably related to a shoulder on shaft 4 adjacent flange 26. The outer race of bearing 44 abuts an annular piston 20 which contacts the diaphragm 34 in axial alignment with recess 32.

Preferably one of the shafts, for example shaft 2, is provided with an axial projection or reduced pilot 52 extending into a complementary bore 54 in the end of shaft 4.

A passageway 56 extends from the recess 32 to an outer surface of frame member 10. Suitable fittings 58 and a conduit 60 provide communication between the chamber defined by recess 32 and a suitable pressure indicator 62. The pressure indicator 62 may be of any desired type but must include means therein to resist pressure applied thereto. Although a pressure indicator is shown on the drawing, many other devices can be used, such as a torque limiting or torque controlling or torque recording instrument or system. It is also possible to use a pressure transducer which will convert hydraulic pressure to air pressure, a mechanical movement, or an electrical or electronic signal.

During assembly an inner convolution 46 and an outer convolution 48 are formed in diaphragm 34. When piston 20 moves axially due to the action of the device, the inner and outer convolutions 46 and 48 roll uniformly up and down in the spaces defined by the surfaces of the clamping ring 40, the piston 20 and the casing 14 respectively, causing the effective piston area of the recess 32 to remain constant. This means that the output pressure will always have the same fixed mathematical relationship to the force applied to piston 20.

The input flange 24 is provided with a recess 68 having a cone-shaped, straight-sided inner surface facing the opening 66. A ball or sphere 64 of only slightly less diameter than the cylindrical opening 66 is positioned in that opening and the diameter of the ball and opening is such that the ball 64 extends axially into engagement with the concave surface of the recess 68 and completely through the flange 26 into contact with a similar recess 70 in the annular body member 50. The cone-shaped recess 68 may be termed an inclined plane surface engageable with the periphery of the ball 64. It will be understood that the flanges 24 and 26 are provided with a plurality of recesses 68 and openings 66, respectively, spaced uniformly about the shafts. In like manner, the body member 50 forming the inner ball race is provided with a plurality of recesses 70 spaced uniformly about the ball circle and in alignment with recess 68 and opening 66. Preferably three such arrangements are provided but more or fewer may be employed if desired. Flange 24 is restrained from moving to the right by abutting the combination thrust and radial bearing 6 which is in turn supported by the snap ring frame member 12. A suitable limit stop and drag prevention element can be applied to piston 20 to prevent excessive motion due to liquid loss and also to prevent torsion on the diaphragm. This can be a series of axial pins 21 having one end in a slide recess.

In the operation, as shaft 2 is rotated in either direction as indicated by the arrows A and B, the cone-shaped recess 68 constitutes an inclined plane surface and tends to force the ball 64 to the left when torque is applied. Since the ball is in contact with the inner ball race member 50 and thrust bearing 44, it cannot move to the left more than a very slight amount, that necessary to build up pressure in the liquid indicating system proportional to the magnitude of the thrust. It will be noted that although an inner ball race member 50 and thrust bearing 44 are used in this configuration, a combination single part may be used to accomplish all the functions of the present two parts, thus eliminating one part. It will be noted that the inclined plane surface of recess 68 bears on the ball 64 during rotation, at a point laterally of the diameter of the ball which is parallel to the shafts and thus transmits an oblique force to the ball. The ball in turn bears against the sides of the opening 66 and transmits a tangential force to the flange 26. The force thus transmitted from flange 24 to flange 26 is transmitted in an oblique direction and has both a tangential and an axial component. The tangential component applies torque to the shaft 4 whereas the axial component applies pressure to the thrust bearing 44 and hydraulic indicating system. It will be noted that no axial thrust, other than that due to friction, is applied to the shaft 4 and all axial thrust on flange 24 is absorbed by bearing 6.

The internal cone angle can be changed to secure different sensitivities of the torque meter for a given gage. For example, when the apex angle of the cone is a small number of degrees, the torque meter would be sensitive to high values of torque; when the apex angle of the cone is large (approaching 180°) then the torque meter would be sensitive to transmitting small amounts of torque. In that manner the gage could easily be used to read zero to 10 foot pounds torque and also zero to 100 foot pounds of torque; also, if another cone angle were included, zero to 1000 foot pounds of torque could be read on the same gage.

It will be further noted that the action of the ball 64 on the straight-sided recess 68 in combination with the constant effective area of recess 32 made possible by the special configuration of the diaphragm 34 produce a pressure signal which is linearly related to the thrust applied to the torque indicator.

In the device described reference has been made to a hydraulic system employing a flexible diaphragm as a recording device but clearly other apparatus may be employed, such as, an annular piston slidably sealed in recess 32 instead of the diaphragm 34. Furthermore, other known forms of force measuring means may be employed instead of the hydraulic system described, without departing from the principles of the invention. Also if desired, a recording or controlling mechanism may be employed in place of or in addition to the visual indicator described. However, the flexible diaphragm mechanism above described has proved to be exceptionally convenient and accurate when the diaphragm is molded as an annular unit with the sealing portions 28 and 30. It is very readily sealed into the parts; and due to the double wrapping of the diaphragm, the frictional resistance of the parts 20 and 50 is practically negligible because there is no stretching action on the diaphragm as it moves back and forth. It will be noted that although sealing beads are employed here, any other clamping or sealing system may be used.

The main housing 10, 12, 14 is maintained stationary by a suitable torque arm or bar which anchors the housing against rotation; and under these circumstances, it will be apparent that the sealed recess 32 is stationary and there is no influence of centrifugal force on the gauging system. Similarly, in the rotating parts since the ball 64 is held against radial outward motion, there can be no centrifugal influence on the piston 20 due to the speed of the device.

It is understood that either shaft 2 or 4 may be used as driving or driven shafts. The relatively movable rotating parts are suitably lubricated either by a sump of oil in the unit or a packing of hard grease. In some embodiments an external circulating oil system is used for lubrication and cooling. The end bearings are preferably sealed with lubricant therein so that they need not be lubricated in the operation.

While only one specific embodiment has been shown and described, it is understood that the invention is not limited thereto, that other mechanisms may be employed within the spirit of this invention which is limited only by the scope of the appended claims.

We claim:

1. In a torque indicating device of the type including a driving shaft and a driven shaft concentrically mounted, a first flange on one shaft, a second flange on the other shaft and an annular body member rotatably disposed relative to one of said shafts, each of said flanges and said body member overlying each other radially, the second of said flanges having one or more axial recesses for radially containing a spherical pressure element, the first flange and said body member having opposed face recesses on opposite sides of the opening of said second flange, said recesses being straight conical formations in contact with the walls of said spherical element wherein relative rotation between the first and second flanges will cause axial shifting of said spherical element and a corresponding axial motion of said body member, and axially displaceable means connected to said body member and responsive to the motion of said body member arranged to record the axial displacement of said body member, the means responsive to the axial motion of said body member comprising an annular piston disposed coaxially with said body member, means forming a chamber on one side of said piston and a sealing means interposed between said piston and said chamber comprising a one-piece annular diaphragm having a portion of its wall overlying the face of said piston member and a portion of its walls looped between the piston member and a mounting means for said diaphragm wherein a shifting of said piston causes said walls to positively wrap and unwrap over the inside and outside walls of said piston both radially outside and inside of said piston, said one of said shafts mounting said second flange having a shoulder adjacent said second flange mounting said body member for rotation and axial motion, and a needle-bearing assembly interposed between said body member and said piston.

2. In a torque indicating device of the type including a driving shaft and a driven shaft concentrically mounted in a housing, a first flange on one shaft, a second flange on the other shaft and an annular body member rotatably disposed relative to one of said shafts, each of said flanges and said body member overlying each other radially, the second of said flanges having one or more cylindrical openings axially therethrough, a spherical ball of substantially the same diameter as said opening axially slidable in said opening and engaging said first flange and said body member, said first flange having a conical, straight-sided recess on the face thereof in contact with surfaces of said ball, said conical surface on said first flange being so arranged as to transmit force to said ball in an oblique direction having an axial and a tangential component, and means for measuring the axial force transmitted from said ball to said body member, the said means for measuring the axial force transmitted to said body member comprising a stationary annular ring piston disposed concentrically adjacent said body member, said ring having an annular space inside and outside its diameters, said housing having a cavity formed adjacent said ring, and an annular one-piece diaphragm surrounding one of said shafts and sealing the piston side of said cavity, said diaphragm having formed radially spaced convolutions outside and inside said annular ring piston capable of rolling axially back and forth on the edges of said annular ring piston as it shifts toward and away from said cavity, and means to block rotation of said annular ring piston relative to said cavity to prevent destructive torque on said diaphragm.

3. In a torque indicating device of the type including a driving shaft and a driven shaft concentrically mounted in a housing, a first flange on one shaft, a second flange on the other shaft and an annular body member rotatably disposed relative to one of said shafts, each of said flanges and said body member overlying each other radially, the second of said flanges having one or more cylindrical openings axially therethrough, a spherical ball of substantially the same diameter as said opening axially slidable in said opening and engaging said first flange and said body member, said first flange having a conical, straight-sided recess on the face thereof in contact with surfaces of said ball, said conical surface on said first flange being so arranged as to transmit force to said ball in an oblique direction having an axial and a tangential component, and means for measuring the axial force transmitted from said ball to said body member, the said means for measuring the axial force transmitted to said body member comprising a stationary annular ring piston disposed concentrically adjacent said body member, said ring having an annular space inside and outside its diameters, said housing having a cavity formed adjacent said ring, and an annular one-piece diaphragm surrounding one of said shafts and sealing the piston side of said cavity, said diaphragm having formed radially spaced convolutions outside and inside said annular ring piston capable of rolling axially back and forth on the edges of said annular ring piston as it shifts toward and away from said cavity, and means to block rotation of said annular ring piston relative to said cavity to prevent destructive torque on said diaphragm, said housing having an end plate and a cylindrical wall closing the cavity, said diaphragm being sealed at its outer edge against said end plate by said wall, and against said end plate at its inner edge by an annular clamping ring.

4. In a torque indicating device of the type including a driving shaft and a driven shaft concentrically mounted, a radially extending plate on one of said shafts, first means axially movable relative to said plate co-axially aligned therewith, means adjacent said shafts for supporting a plurality of balls adjacent said plate between said plate and said first means, said plate having recesses formed with straight conical walls in contact with the walls of said balls wherein relative rotation between said shafts will cause a shifting of said balls against said first means and means responsive to the relative rotation between said shafts to record the amount of said rotation in response to the axial motion of said balls, the means responsive to the relative rotation of said shafts comprising an annular piston disposed adjacent said first means including a toroidal member co-axial with said shafts and an annular flexible diaphragm member having inner and outer convolutions overlying said toroidal member and adapted to wrap and unwrap in response to axial motion of said toroidal member and a body of fluid sealed adjacent said diaphragm serving as a response body for motion of said diaphragm, friction-reducing means comprising a bearing set between said annular piston and said axially movable means, and means associated with said piston to block rotation of said piston while permitting axial motion thereof to prevent torque forces on said flexible diaphragm.

References Cited in the file of this patent

UNITED STATES PATENTS

| | | |
|---|---|---|
| 2,061,896 | Chilton | Nov. 24, 1936 |
| 2,289,285 | Chilton | July 7, 1942 |
| 2,718,782 | Steinbruegge et al. | Sept. 27, 1955 |
| 2,731,534 | Hansen et al. | Jan. 17, 1956 |
| 2,911,606 | Hoffman | Nov. 3, 1959 |